(12) United States Patent
Yao

(10) Patent No.: US 7,372,568 B1
(45) Date of Patent: May 13, 2008

(54) LOW COST POLAMETRIC DETECTOR

(75) Inventor: X Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 11/474,122

(22) Filed: Jun. 22, 2006

Related U.S. Application Data

(60) Provisional application No. 60/693,354, filed on Jun. 22, 2005.

(51) Int. Cl.
*G01J 4/00* (2006.01)
(52) U.S. Cl. ..................................................... 356/369
(58) Field of Classification Search ..................... None
See application file for complete search history.

(56) References Cited

U.S. PATENT DOCUMENTS

| | | | | |
|---|---|---|---|---|
| 5,982,539 A | * | 11/1999 | Shirasaki | 359/484 |
| 7,187,442 B2 | * | 3/2007 | Chinnock et al. | 356/364 |
| 2006/0126066 A1 | * | 6/2006 | Kawakami et al. | 356/364 |

* cited by examiner

*Primary Examiner*—Tu T Nguyen
(74) *Attorney, Agent, or Firm*—Fish & Richardson P.C.

(57) ABSTRACT

Polarimeters based on transversal division of the input beam and use of different polarization elements in different polarization states to change polarizations of different portions of the input beam so that the power levels of the different portions of the input beam can be measured to determine the polarization state of the input beam. A wedged substrate can be used to direct the different portions of the input beam at different directions and a lens can be used to focus these different portions at different locations at a plane.

23 Claims, 4 Drawing Sheets

LOW COST POLAMETRIC DETECTOR

This application claims the benefit of U.S. Provisional Application No. 60/693,354 entitled "Low Cost Polametric Detector" and filed Jun. 22, 2005, the disclosure of which is incorporated by reference as part of the specification of this application.

BACKGROUND

This application is related to devices and techniques for measuring optical polarization of light.

Optical polarization is an important parameter of an optical signal in various optical systems. For example, in fiber optic communication systems, polarization-dependent effects in fibers and other devices, such as polarization-dependent loss (PDL) and polarization-mode dispersion (PMD), can have significant impacts on performance and proper operations of optical devices or systems. Hence, it may be desirable to measure and monitor the state of polarization (SOP) and the degree of polarization (DOP) of an optical signal in these and other systems.

Optical polarimeters are devices designed to measure polarization of light and can be implemented in various configurations. Some commercial polarimeters use rotating waveplates to control the polarization of the input light and measure optical power levels of the controlled input light for determine the Stokes parameters of the input light. Such polarimeters can be bulky, expensive, slow, and have a relatively short life time, and therefore may not suitable for certain applications such as system applications in fiber networks. Some other polarimeters use four optical detectors and require complicated beam-splitting optics. Therefore, these polarimeters can also be bulky, expensive and difficult to align and calibrate.

SUMMARY

This application, among others, disclose implementations of polarimeters based on transversal division of the input beam. The disclosed polarimeters can be implemented to have simple structures that may be of a low cost and packaged in a relatively compact size. Low cost polarimeters may be important to certain applications, such as applications with polarization analysis, applications for network monitoring and sensor readout.

In one implementation, a device is described to include a substrate and polarization elements located on the substrate. The polarization elements are configured at different polarization states and spatially separated from one another to receive different portions of a common input optical beam to produce transmitted light beams in different polarization states. The device further includes an optical detector that includes active detector sensing areas, each of which corresponds to a respective polarization element and receives a transmitted light beam from the respective polarization element.

In another implementation, a device is described to include polarization elements configured at different polarization states and spatially separated from one another to receive different portions of a common input optical beam to produce transmitted light beams in different polarization states. A wedged substrate is included in this device on which the polarization elements are located. The wedged substrate transmits light and has angled surfaces to cause the transmitted light beams to propagate at different directions. A lens is positioned to receive transmitted light beams from the polarization elements placed on the wedged substrate and to focus the transmitted light beams. The device further includes fibers located to receive focused beams from the lens, respectively.

In yet another implementation, a device includes polarization elements at different polarization states that are spatially separated from one another to receive different portions of a common input optical beam to produce transmitted light beams, and optical detectors, each of which corresponds to a designated polarization element, to respectively receive transmitted light beams from the polarization elements and to produce detector output signals that in combination contain information on a state of polarization of the common input beam.

These and other implementations are described in greater detail in the drawings, the detailed description and the claims.

DETAILED DESCRIPTION

Figure 1:
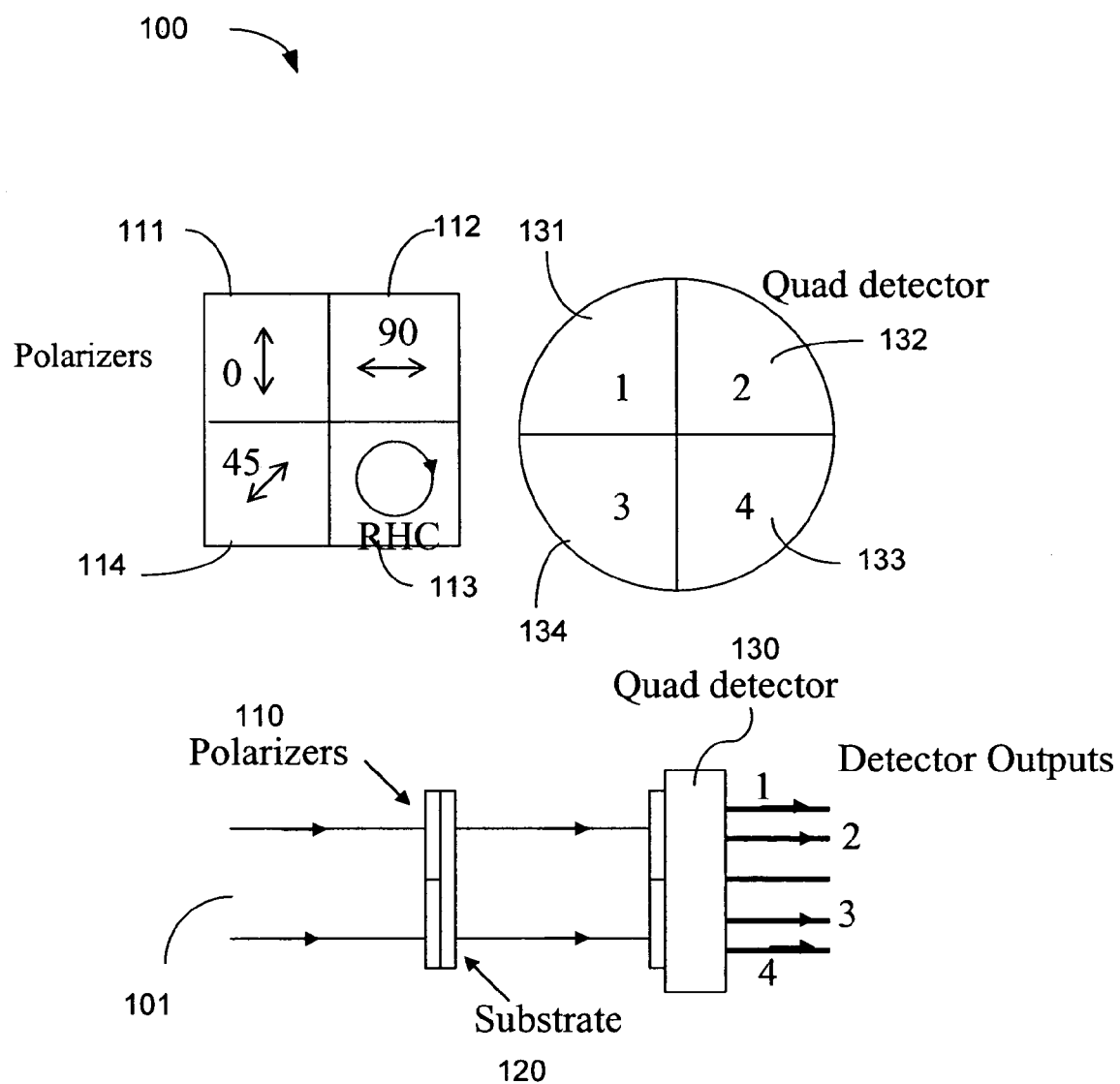
FIG. 1 shows one example of a polarimeter.

FIG. 1 shows one exemplary implementation of a polarimeter 100. This device 100 includes a polarization unit 110 that has four different optical polarizers 111, 112, 113 and 114 that are spatially separated from one another to receive different portions of a common input beam 101 whose polarization is to be measured. The four different optical polarizers 111, 112, 113 and 114 modify the input optical polarization of the different portions of the input beam 101 to produce different polarization states in the different portions of the input beam 101, respectively. The polarization unit 110 can be placed on a substrate 120 on which the four different optical polarizers 111, 112, 113 and 114 are positioned. An optical detector 130 having a 4-detector array (or a quard detector) with four different optical sensing regions or optical detectors 131, 132, 133 and 134 is placed in the optical path of the light output from the polarization unit 110 to receive and detect the corresponding four different portions, respectively, of the input beam 101 produced by the polarization unit 110. The detector outputs from the optical detectors 131, 132, 133 and 134 and the polarization states controlled by the four different optical polarizers 111, 112, 113 and 114 can be used to determine the Stokes parameters of the polarization of the input beam 101. This processing can be performed in a controller of the polarimeter 100.

Many polarizer combinations are possible for the polarization unit 110 with different polarizers as long as at least four different portions of the input beam have different polarizations after passing through the polarization unit 110. In FIG. 1, the four optical polarizers 111, 112, 113 and 114 are shown to be a linear vertical polarizer, a linear horizontal polarizer, a right hand circular polarizer and a 45-degree linear polarizer. In other implementations, for example, a LHC (left hand circular) polarizer can be used to replace the RHC (right hand circular) polarizer 113. The orientations of the exemplary polarizers can be different what is shown in FIG. 1. In yet other implementations, three polarizers 112, 113 and 114 are sufficient and the position occupied by the polarizer 111 can be left empty without any polarization element as long as the four portions of the input beam 101, after passing through the polarization unit 110, have different polarizations. The locations of the polarizers in the polarizer arrangement in FIG. 1 can also be exchanged. The polarizers 111, 112, 113 and 114 can be affixed to the substrate 120, either on the first side of substrate 120 to receive the input beam 101 or on the second side to face the detector 130 or a lens 220 as in FIG. 2. Certainly, the polarization unit 110 may be designed to divide the input beam 101 into more than four portions.

The input light beam 101 passes through the polarizer assembly 110 with the center of the beam 101 to be close to the center of the assembly 110 as possible to divide the input beam 101 into approximately equal portions. Either the substrate 120 or the polarizers 111, 112, 113 and 114 can face the input beam 101. In FIG. 1, the polarizers 111, 112, 113 and 114 face the beam 101. The gaps between the polarizers 111, 112, 113 and 114 may be filled with optically opaque material to prevent light from going through the gaps to reach the optical detectors 131, 132, 133 and 134 in part because the polarization of such light in the gaps is not modified and presences of such light at the detectors 131, 132, 133 and 134 reduces the signal to noise ratio of the detection.

In the design in FIG. 1, the total sensing area of the four detectors 131, 132, 133 and 134 is approximately the same as the total transversal or cross section area of the input beam 101. In some applications, this design may require the size of the active area of the detector array to be relatively large, resulting a slower detection speed and an increased cost.

Figure 2:
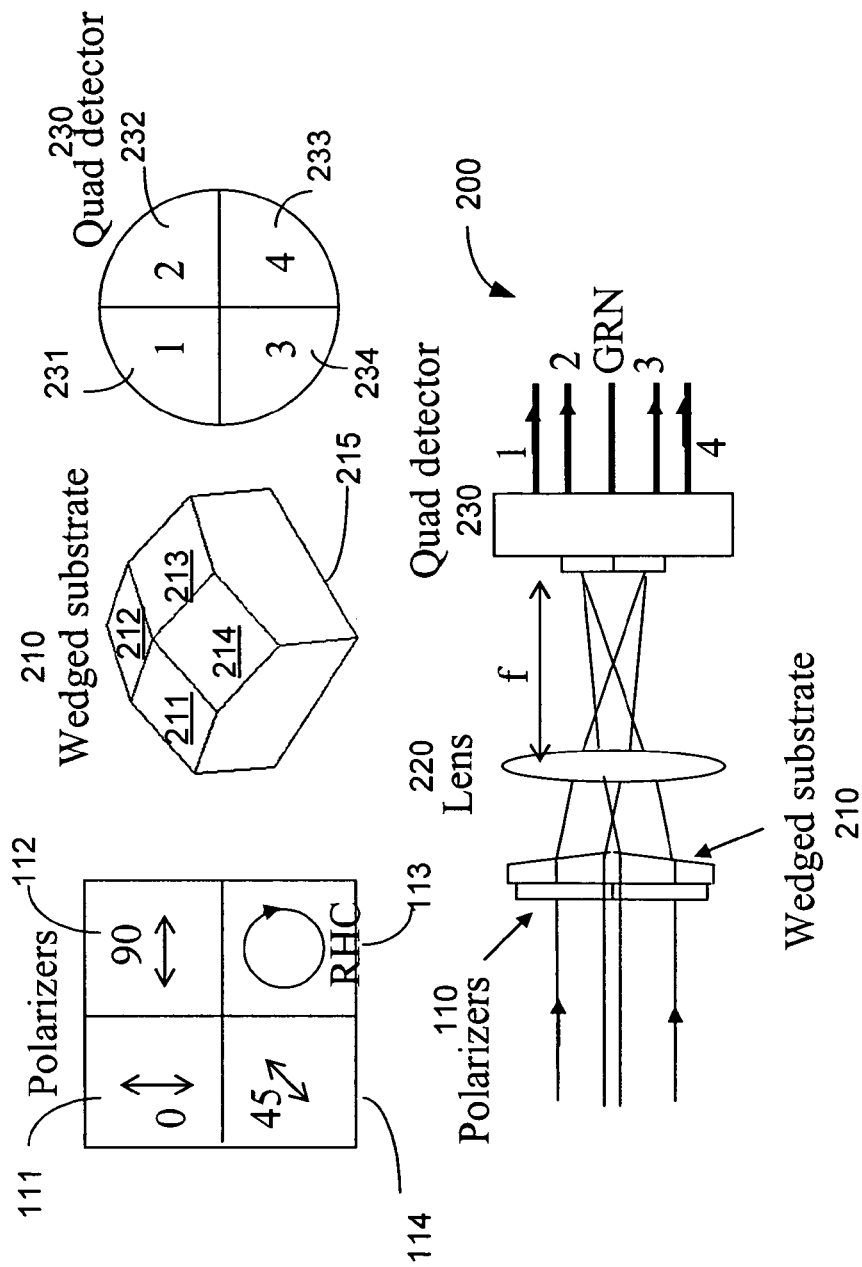
FIG. 2 shows one example of a polarimeter using a wedged substrate to change directions of different beams separated from a common input beam.

The exemplary polarimeter 200 in FIG. 2 uses an alternative design to reduce the detector active area. This design includes a wedged substrate 210 to replace the planar substrate 120 in FIG. 1 and an optical detector 230 with four detectors 231, 232, 233 and 234 with small active detector sensing areas. In the illustrated example, the wedged substrate 210 has a first flat side 215 to hold the polarizers 111, 112, 113 and 114 and a second wedged side with four wedged surfaces 211, 212, 213 and 214 to direct four portions of the input beam 101 passing through four different polarizers 111, 112, 113 and 114 into four different directions as four different beams. The polarizers 111, 112, 113 and 114 may also be placed on the four wedged surfaces 211, 212, 213 and 214, respectively, on the wedged side. Each wedged surface is tilted at an angle and is not perpendicular to the optic axis of the device so that a light ray changes its direction due to refraction at the wedged surface. A focusing lens 220 is placed in the optical path between the wedged substrate 210 and the optical detector 230 to focus the four portions of the beam onto the four different detectors 231, 232, 233 and 234. In the illustrated example, the wedged surfaces face the lens 220. The focusing by the lens 220 reduces the beam size of each of the four beams output by the wedged substrate 210 and thus the size of the active detector sensing area of the detectors 231, 232, 233 and 234 can be reduced accordingly. The detectors 231, 232, 233 and 234 with smaller active detector areas can be used to achieve a higher detection speed and lowered photodetector cost in comparison with a detector 130 with four larger detectors 131, 132, 133 and 134.

Figure 3:
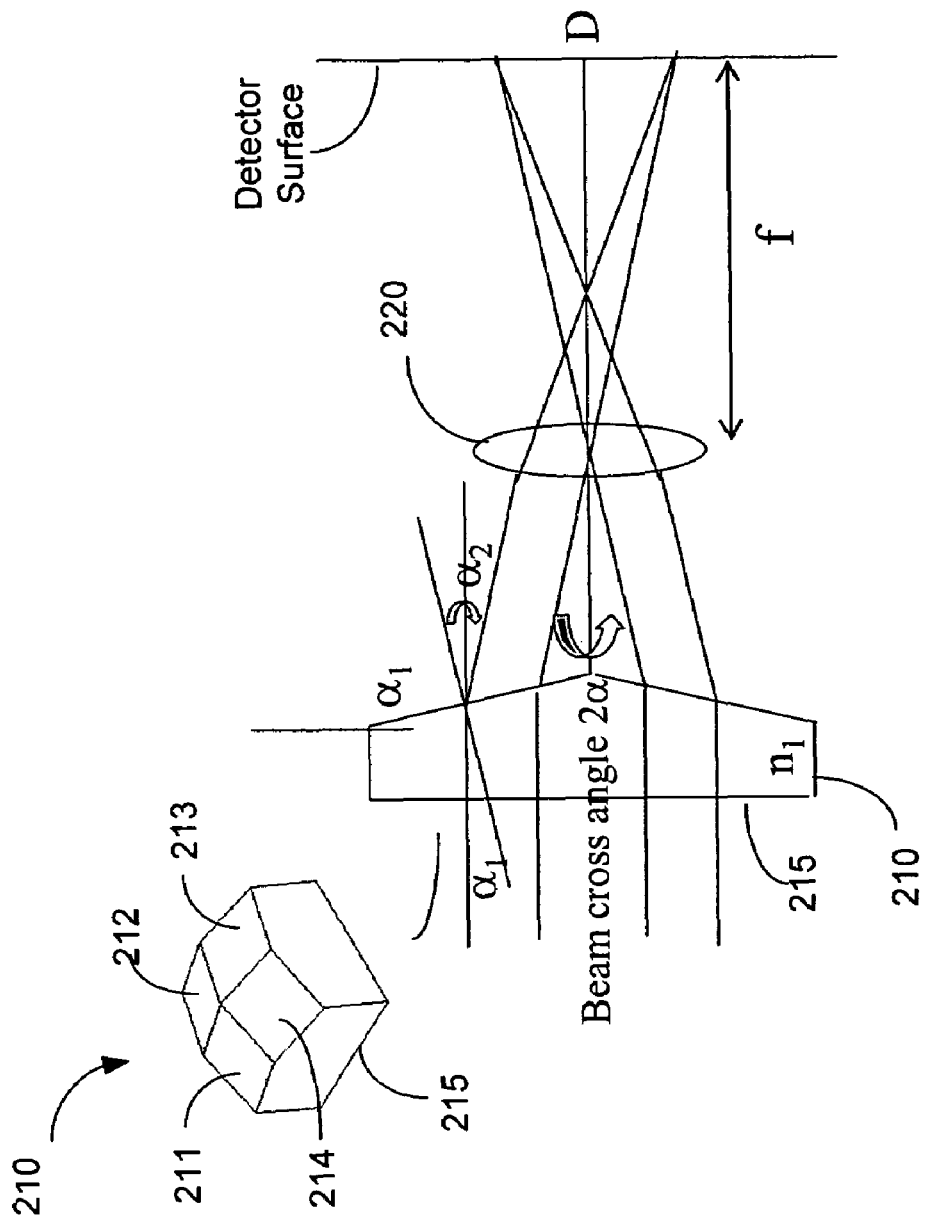
FIG. 3 illustrates operation of the wedged substrate shown in FIG. 2.

FIG. 3 illustrates the relationship between the wedge angle (or crossing angle) $2\alpha$ of the wedge side of the wedged substrate 210, the detector separation of the 4-detector array and the focal length f of the lens 220. For example, in one implementation for a wedge with a crossing angle of 3.7 degrees (commonly used in other fiber optic devices) and a beam separation of 0.5 mm on the detector, the focal length of the lens 220 is 7.8 mm. Assume the refractive index of the wedged substrate material is n1, and each wedged surface forms an angle of $\alpha 1$ with the optic axis of the polarimeter. In the illustrated geometry in FIG. 3, $n1 \sin\alpha 1 = n2 \sin\alpha 2$ where n2 is the refractive index of the air so that $\alpha 2 \sim n1\alpha 1$ when the angles are small and $n2=1$. Therefore, $\alpha = \alpha 2 - \alpha 1 = (n1-1)\alpha 1 = 0.5\alpha 1$. The beam spot separation of different beams output from the wedged substrate is $D = 2f \tan\alpha$. For the wedges with a crossing angle $2\alpha$ of 3.7 degrees, the wedge angle is also 3.7 degrees. For a spot separation of $D=0.5$ mm, the focal length f is 7.8 mm.

Figure 4:
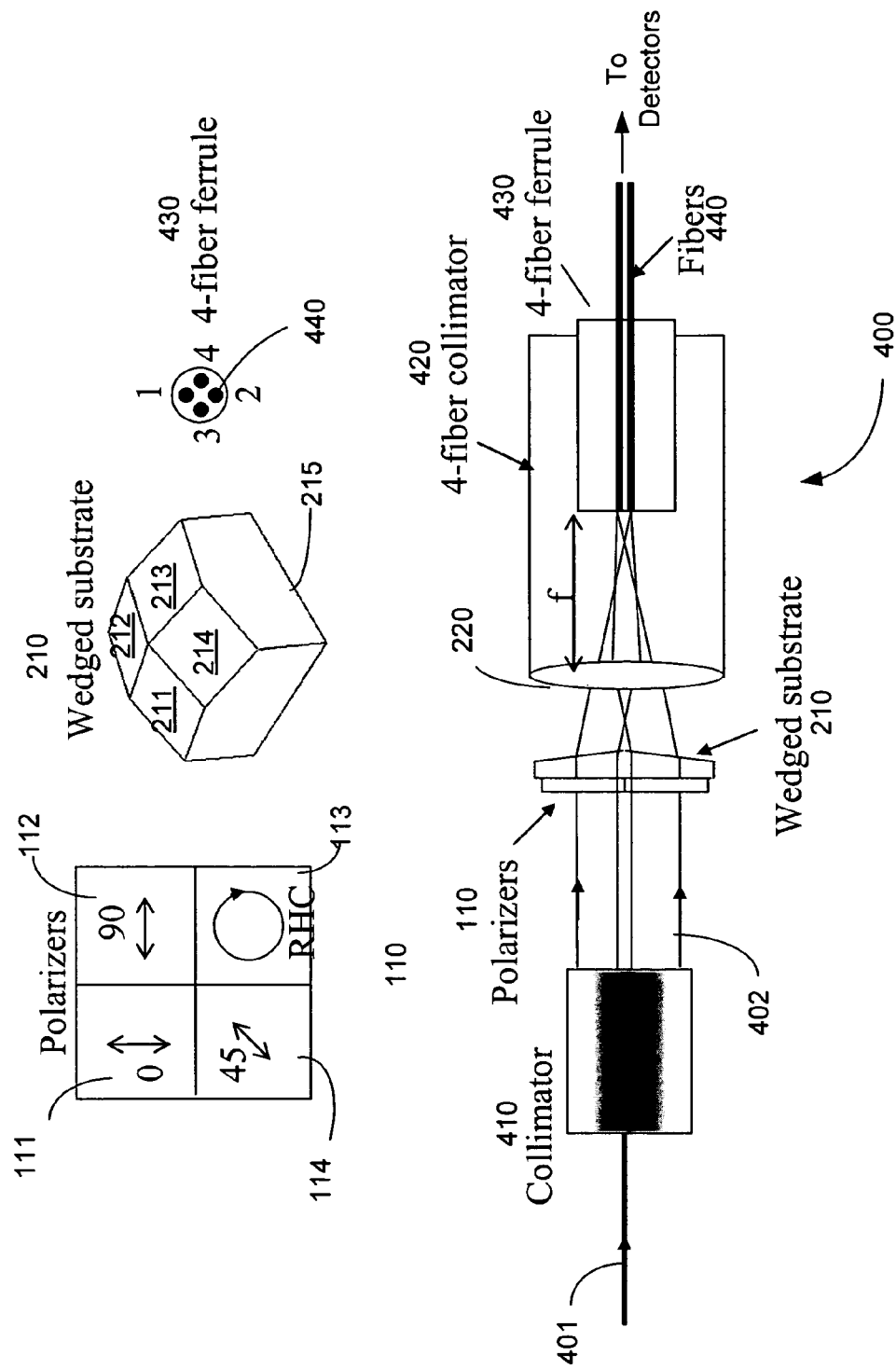
FIG. 4 shows one example of a fiber pigtail implementation of a polarimeter using a wedged substrate to change directions of different beams separated from a common input beam.

For systems requiring pigtailed photodectors to achieve a high detection speed, or systems requiring remote detection of optical signals, coupling light in different portions of the beam into different fibers can be achieved by using an exemplary polametric detector 400 in FIG. 4.

The polametric detector 400 includes an optical collimator 410 at the input to expand an input beam 401 into a collimated beam 402 with a larger cross section. This collimated beam 402 lens may be implemented with different lenses, including a graded index lens, a c-lens, and others. A wedged substrate 210 is used for mounting the four polarizers 111, 112, 113 and 114 either on the flat side or the wedged side of the substrate 210 to direct the four different portions of the beam into four different directions. A lens 220 is used to focus the four beams produced by the wedged substrate 210. A ferrule 430 containing four fibers 440 is placed at the focal plane of the lens 220 in order for the lens 220 to focus the four portions of the beam into different fibers 440, respectively. The four fibers 440 are coupled to four different optical detectors which measure the power levels of the four beams in the fibers 440 for determining the Stokes parameters of the input polarization. A fiber collimator 420 may be used to hold the lens 220 and the fiber ferrule 430 at a fixed position relative to each other. As an example, for a fiber separation of 0.125 mm and a crossing angle of 3.7 degrees, the corresponding focal length is 1.95 mm.

Only a few implementations are disclosed. However, it is understood that variations and enhancements may be made.

What is claimed is:

1. A device for measuring optical polarization of light, comprising:
    a substrate that transmits light;
    a plurality of polarization elements located on the substrate, the polarization elements configured at different polarization states and spatially separated from one another to receive different portions of a common input optical beam to produce transmitted light beams in different polarization states; and
    an optical detector comprising a plurality of active detector sensing areas, each of which corresponds to a respective polarization element and receives a transmitted light beam from the respective polarization element,
    wherein the substrate is a wedged substrate having a first side on which the plurality of polarization elements are placed and a second, opposite side having a plurality of angled surfaces to cause the transmitted light beams to propagate at different directions, the device further comprising:
a lens between the polarization elements and the optical detector to focus the transmitted light beams onto the active detector sensing areas, respectively.

2. The device as in claim 1, wherein the plurality of polarization elements include three optical polarizers at different polarization states different from an input polarization of input optical beam to modify three portions of the input beam while leaving a polarization of a fourth portion unchanged, and wherein the optical detector is a quad detector with four active detector sensing areas that receive three transmitted light beams corresponding to the three portions modified by the three optical polarizers and a transmitted light beam corresponding to the fourth portion, respectively.

3. The device as in claim 1, wherein the plurality of polarization elements include four optical polarizers at different polarization states and wherein the optical detector is a quad detector with four active detector sensing areas that receive the transmitted beams corresponding to the four portions modified by the four optical polarizers, respectively.

4. The device as in claim 1, comprising:
an optical collimator placed in an optical path of the input optical beam to collimate the input optical beam and to direct the collimated input optical beam to the wedged substrate and the polarization elements.

5. A device for measuring optical polarization of light, comprising:
a plurality of polarization elements configured at different polarization states and spatially separated from one another to receive different portions of a common input optical beam to produce transmitted light beams in different polarization states, respectively;
a wedged substrate on which the polarization elements are located, the wedged substrate transmitting light and having a plurality of angled surfaces on one side of the wedged substrate to cause the transmitted light beams to propagate at different directions;
a lens positioned downstream from the wedged substrate and the polarization elements to receive the transmitted light beams at the different directions and to focus the transmitted light beams at different locations;
a plurality of fibers located at or near a focal plane of the lens to receive focused beams from the lens, respectively; and
a plurality of optical detectors, each optical detector coupled to a respective fiber of the optical fibers.

6. The device as claim 5, further comprising a fiber ferrule to hold the fibers in place and to place input facets of the fibers at a focal plane of the lens.

7. The device as in claim 5, comprising:
an optical collimator placed in an optical path of the input optical beam to collimate the input optical beam and to direct the collimated input optical beam to the wedged substrate and the polarization elements.

8. The device as in claim 5, wherein the polarization elements are located on angled surfaces of the wedged substrate, respectively.

9. The device as in claim 5, wherein the wedged substrate has a first side and a second opposite side and the angled surfaces are on the second side, and wherein the polarization elements are located on the first side of the wedged substrate at different locations that correspond to different angled surfaces on the second side, respectively.

10. The device as in claim 5, wherein the plurality of polarization elements include three optical polarizers at three different polarization states different from an input polarization of input optical beam to modify three portions of the input optical beam while leaving a polarization of a fourth portion of the input optical beam unchanged, and wherein the optical detector is a quad detector with four active detector sensing areas that receive three transmitted light beams corresponding to the three portions modified by the three optical polarizers and a fourth transmitted light beam corresponding to the fourth portion, respectively.

11. The device as in claim 5, wherein the plurality of polarization elements include four optical polarizers at four different polarization states and wherein the optical detector is a quad detector with four active detector sensing areas that receive the transmitted beams corresponding to the four portions modified by the four optical polarizers, respectively.

12. A device for measuring optical polarization of light, comprising:
a plurality of polarization elements at different polarization states that are spatially separated from one another to receive different portions of a common input optical beam to produce transmitted light beams;
a wedged substrate on which the polarization elements are located, the wedged substrate transmitting light and having a plurality of angled surfaces on one side of the wedged substrate to cause the transmitted light beams to propagate at different directions;
a lens positioned to receive the transmitted light beams at the different directions and to focus the transmitted light beams at different locations at a plane; and
a plurality of optical detectors at or near the plane to respectively receive transmitted light beams output by the lens and to produce detector output signals that contain information on a state of polarization of the input beam.

13. The device in claim 12, wherein the polarization elements are located on a side of the wedged substrate that receives the common input optical beam.

14. The device in claim 12, wherein the polarization elements are located on a side of the wedged substrate that faces the lens.

15. The device as in claim 12, wherein the polarization elements are located on angled surfaces of the wedged substrate, respectively.

16. The device as in claim 12, wherein the wedged substrate has a first side and a second opposite side and the angled surfaces are on the second side, and wherein the polarization elements are located on the first side of the wedged substrate at different locations that correspond to different angled surfaces on the second side, respectively.

17. The device as in claim 12, comprising:
an optical collimator placed in an optical path of the input optical beam to collimate the input optical beam and to direct the collimated input optical beam to the wedged substrate and the polarization elements.

18. The device as in claim 12, wherein the plurality of polarization elements include three optical polarizers at three different polarization states different from an input polarization of input optical beam to modify three portions of the input optical beam while leaving a polarization of a fourth portion of the input optical beam unchanged, and wherein the optical detector is a quad detector with four active detector sensing areas that receive three transmitted light beams corresponding to the three portions modified by the three optical polarizers and a fourth transmitted light beam corresponding to the fourth portion, respectively.

19. The device as in claim 12, wherein the plurality of polarization elements include four optical polarizers at four different polarization states and wherein the optical detector is a quad detector with four active detector sensing areas that receive the transmitted beams corresponding to the four portions modified by the four optical polarizers, respectively.

20. A method for measuring optical polarization of light, comprising:

directing an input beam of light to transmit through a wedged substrate having a plurality of angled surfaces on one side of the wedged substrate to split the input beam into a plurality of transmitted light beams by the angled surfaces, respectively, to propagate at different directions;

in the optical path of the input beam, providing a plurality of polarization elements configured at different polarization states and spatially separated from one another to respectively correspond to the angled surfaces on the wedged substrate, one polarization element to one angled surface, to cause the transmitted light beams produced by the wedged substrate to be in different polarization states, respectively;

using a lens positioned downstream from the wedged substrate and the polarization elements to receive the transmitted light beams at the different directions and to focus the transmitted light beams at different locations;

using a plurality of optical detectors spaced from the lens to receive focused beams from the lens, respectively, and to produce detector output signals that contain information on a state of polarization of the input beam; and processing the detector output signals to measure a polarization state of the input beam.

21. The method as in claim 20, comprising:

attaching the polarization elements on the angled surfaces, one polarization element per angled surface, respectively.

22. The method as in claim 20, wherein the plurality of polarization elements include three optical polarizers at three different polarization states different from an input polarization of input optical beam to modify three portions of the input optical beam while leaving a polarization of a fourth portion of the input optical beam unchanged, and wherein the optical detector is a quad detector with four active detector sensing areas that receive three transmitted light beams corresponding to the three portions modified by the three optical polarizers and a fourth transmitted light beam corresponding to the fourth portion, respectively.

23. The method as in claim 20, wherein the plurality of polarization elements include four optical polarizers at four different polarization states and wherein the optical detector is a quad detector with four active detector sensing areas that receive the transmitted beams corresponding to the four portions modified by the four optical polarizers, respectively.

* * * * *

UNITED STATES PATENT AND TRADEMARK OFFICE
CERTIFICATE OF CORRECTION

| | |
|---|---|
| PATENT NO. | : 7,372,568 B1 |
| APPLICATION NO. | : 11/474122 |
| DATED | : May 13, 2008 |
| INVENTOR(S) | : Xiaotian Steve Yao |

Page 1 of 1

It is certified that error appears in the above-identified patent and that said Letters Patent is hereby corrected as shown below:

Column 5, line 49, (Claim 6) delete "as" and insert --as in--.

Column 6, line 36, (Claim 13) delete "in" and insert --as in--.

Column 6, line 39, (Claim 14) delete "in" and insert --as in--.

Signed and Sealed this

Sixteenth Day of December, 2008

JON W. DUDAS
*Director of the United States Patent and Trademark Office*